United States Patent [19]

Wataya

[11] Patent Number: 4,887,151
[45] Date of Patent: Dec. 12, 1989

[54] ENCODING APPARATUS FOR COLOR IMAGE DATA WITH BLOCK-BY-BLOCK INDIVIDUAL QUANTIZING OR INDIVIDUAL ENCODING OF LUMINOSITY, STRUCTURE, AND COLOR INFORMATION

[75] Inventor: Masafumi Wataya, Tokyo, Japan

[73] Assignee: Canon Kabushiki Kaisha, Tokyo, Japan

[21] Appl. No.: 342,583

[22] Filed: Apr. 19, 1989

Related U.S. Application Data

[63] Continuation of Ser. No. 66,119, Jun. 25, 1987, abandoned.

[30] Foreign Application Priority Data

Jun. 30, 1986 [JP]  Japan ................................ 61-152958
Jan. 28, 1987 [JP]  Japan ................................ 62-159434
Jan. 28, 1987 [JP]  Japan ................................ 62-159444

[51] Int. Cl.$^4$ .......................... G03F 3/08; H04N 1/46
[52] U.S. Cl. ........................................ 358/80; 358/75
[58] Field of Search ................... 358/75, 75 IJ, 78, 80

[56] References Cited

U.S. PATENT DOCUMENTS

| | | | |
|---|---|---|---|
| 4,553,172 | 11/1985 | Yamada et al. | 358/75 |
| 4,646,134 | 2/1987 | Komatsu et al. | 358/80 |
| 4,786,975 | 11/1988 | Postl | 358/283 |
| 4,797,945 | 1/1989 | Suzuki et al. | 358/280 |

FOREIGN PATENT DOCUMENTS 54-102825  8/1979  Japan ................................... 358/75
59-110274  6/1984  Japan .

Primary Examiner—James J. Groody
Assistant Examiner—Randall S. Svihla
Attorney, Agent, or Firm—Fitzpatrick, Cella, Harper & Scinto

[57] ABSTRACT

There is disclosed an apparatus for efficient and faithful encoding of color image data, by dividing color image data into blocks, extracting luminosity information, structure information and color information from each block, and for each block, individually encoding or individually quantizing the color image the structure information and the luminosity information. The signal system may be one employing signals of low mutual correlation, such as an L*a*b* signal system. An orthogonal transformation of the L* components of the color image data for the respective blocks may be performed.

17 Claims, 10 Drawing Sheets

FIG. 1
| L (LIGHTNESS INFORMATION) | S (STRUCTURE INFORMATION) | C (COLOR INFORMATION) |
FIG. 2A
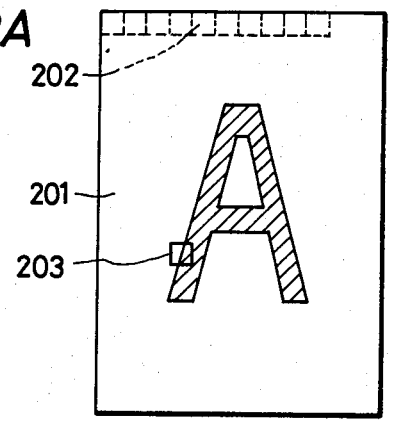
FIG. 2B
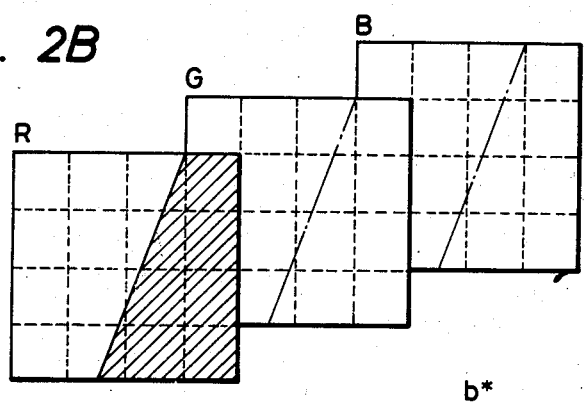
FIG. 2C
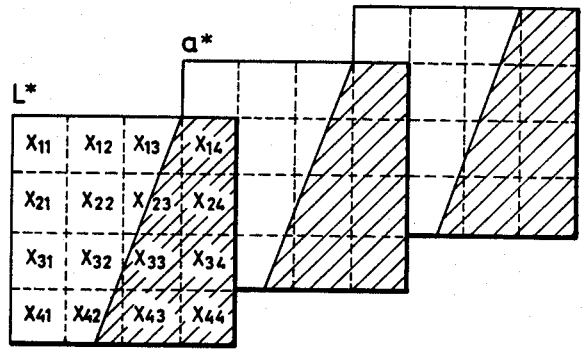

FIG. 10
| HUE ($\theta$) | SATURATION (h) |
FIG. 11A
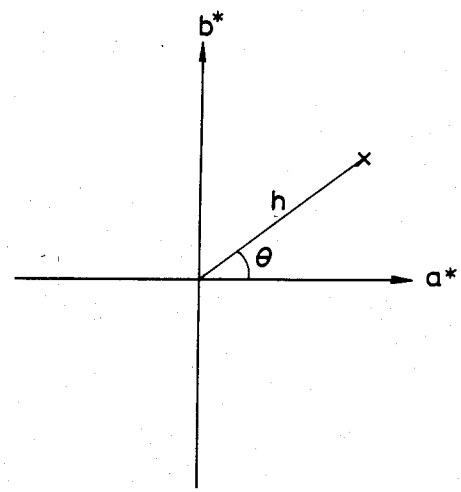
FIG. 11B
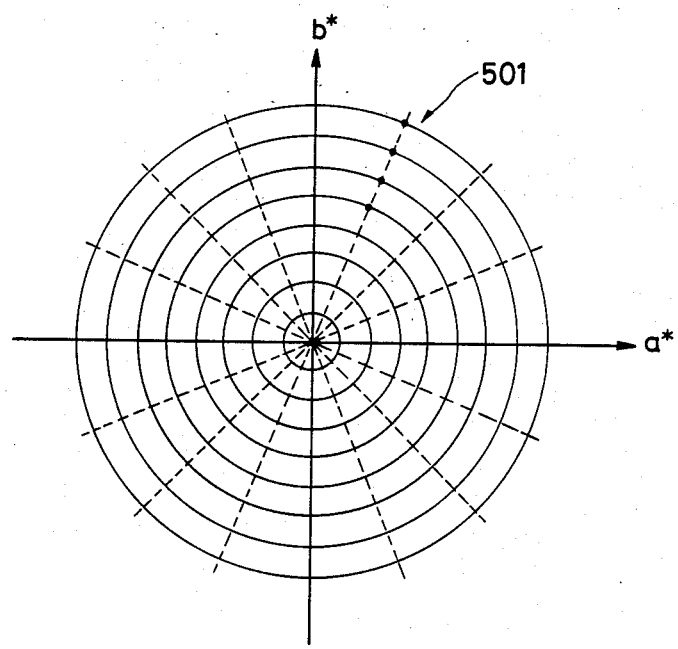

ENCODING APPARATUS FOR COLOR IMAGE DATA WITH BLOCK-BY-BLOCK INDIVIDUAL QUANTIZING OR INDIVIDUAL ENCODING OF LUMINOSITY, STRUCTURE, AND COLOR INFORMATION

This application is a continuation of application Ser. No. 066,119 filed June 25, 1987, now abandoned.

BACKGROUND OF THE INVENTION

1. Field of the Invention

The present invention relates to a color image data encoding apparatus, for encoding color image data obtained by a color original reader or a color television camera.

2. Related Background Art

In storage or transmission of image information, it has been customary to reduce the redundancy by suitable encoding in consideration of the efficiency. Such encoding has been principally developed for binary black-and-white or color image information.

However, there have been recently developed finer image information with multiple levels, including multi-level color image information.

Consequently, as encoding process has become necessary also for such multi-level color image information. So far, such encoding has been made by applying the conventional black-and-white encoding process to each of three primary colors of red, green and blue, by digitization utilizing correlation of three primary colors in each pixel.

However the former process mentioned above is naturally inefficient and often causes errors in color registration. The latter process is relatively free from errors in color registration, but cannot be efficient because it strongly relies on the correlation of the primary colors.

On the other hand, in certain equipment such as facsimile, electronic file or copying machine, it is often required to effect a conversion of luminosity or color on the data transmitted or stored in a buffer memory or the like. In such case, a conversion on the encoded data is desirable in consideration of efficiency. However the conventional encoding processes do not allow direct conversion of the encoded color image data.

For example in a facsimile system, such requirement has been resolved by sending the information on such conversion from the receiver to the transmitter, which in response resends the data after such conversion. Such solution naturally requires an increased time and complicates the mutual communication between the transmitter and the receiver. Also in an electronic file or the like, in which such solution is not available, the encoded data have to be decoded before the required conversion can be made. Such process results in deterioration of image quality due to the repeated processes and requires an additional working memory, so that the advantage of employing encoded data cannot be fully exploited.

SUMMARY OF THE INVENTION

In consideration of the foregoing, an object of the present invention is to avoid the drawbacks in the above-explained conventional technologies and to achieve compression encoding of color image data with a high efficiency and with satisfactory color reproducibility.

Another object of the present invention is to provide a color image data encoding apparatus capable of achieving a high-speed processing and minimizing the deterioration of the image quality.

Still another object of the present invention is to provide a color image data converting and processing apparatus capable of a luminosity conversion or a color conversion of encoded color image data.

BRIEF DESCRIPTION OF THE DRAWINGS

FIG. 1 is a view of a data format after encoding;

FIGS. 2A, 2B and 2C are views showing the mode of block definition and signal conversion;

FIG. 10 is a view showing the structure of color information C;

FIGS. 11A and 11B are charts showing the relationship between hue $\theta$ and saturation h;

FIGS. 12 and 13 are block diagrams of circuits for color conversion and decoding; and FIGS. 14A and 14B are charts showing examples of color data conversion.

DETAILED DESCRIPTION OF THE PREFERRED EMBODIMENTS

Now the present invention will be clarified in detail by preferred embodiments thereof shown in the attached drawings.

In the following there will be explained the outline of color image data encoding according to the present invention. At first three primary colors or red (R), green (G) and blue (B) representing a full-color image are converted into signals of weaker mutual correlation allowing separation into luminosity information and color information, and said signals are divided into small blocks. Then said signals are encoded, for each block, into a format containing luminosity information indicating the brightness in said block, structure information indicating for example an edge present in said block, and color information indicating color in said block.

FIG. 1 shows an example of the basic concept of said color image data encoding. The signals R, G, B are converted into L*a*b* signal of CIE 1976 uniform color space, as an example of a signal system with reduced mutual correlation, and the information in each small block is encoded into a format consisting of three elements of luminosity (L), structure (S) and color (C).

FIG. 2A illustrates the mode of conversion from the RGB signal system to the L*a*b* signal system in an image, and of definition of square blocks of 4×4 pixels each as an example of the small block. On an original image 201, there are formed blocks 202 of 4×4 pixels each from a corner of the original image. 203 indicates a block containing an image edge therein.

FIG. 2B illustrates the distribution of color image data of three primary colors R, G, B constituting the block 203 in case the original image contains a red letter. The edge appears only in the red image.

FIG. 2C illustrates signals L*, a*, b* obtained by conversion from the R, G, B signals shown in FIG. 2B. $X_{11}$–$X_{44}$ represent components of the signal L* in the block.

The conversion from the RGB signal system to the L*a*b* signal system is achieved according to the following equations:

$$\begin{cases} X = XrR + XgG + XbB \\ Y = YrR + YgG + YbB \\ Z = ZrR + ZgG + ZbB \end{cases}$$

wherein Xr, Xg, Xb, Yr, Yg, Yb, Zr, Zg and Zb are constants.

From these equations there are derived:

$$L* = 116 (Y/Y_0)^{1/3} - 16 \; (Y/Y_0 > 0.008856)$$
$$a* = 500[(X/X_0)^{1/3} - (Y/Y_0)^{1/3}]$$
$$b* = 200[(Y/Y_0)^{1/3} - (Z/Z_0)^{1/3}]$$

wherein $X_0$, $Y_0$ and $Z_0$ are values corresponding to reference white light.

Figure 3:
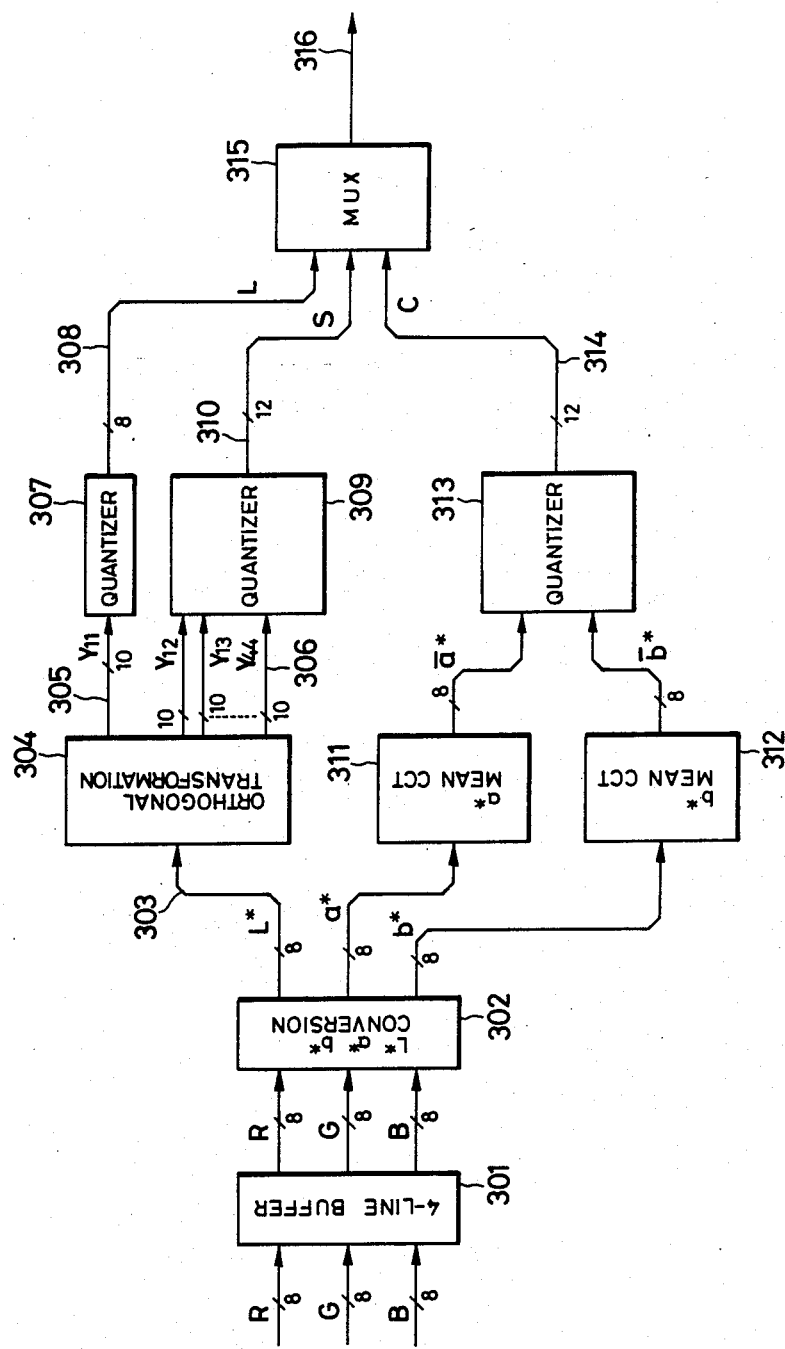
FIG. 3 is a block diagram of an encoding circuit embodying the present invention.

FIG. 3 shows an embodiment of the circuit for achieving the encoding shown in FIG. 1. A 4-line buffer 301 is used for temporarily storing the R, G and B signals entered line by line for example from a color scanner, for the purpose of defining the aforementioned 4×4 blocks. The signals of 4 lines stored in said 4-line buffer 301 are read in a size of 4×4 pixels to define a block of 4×4 pixels to define a block of 4×4 pixels. An L*a*b* converting unit 302 performs the conversion from the RGB system to the L*a*B* system for each pixel according to the above-explained converting equations.

unit 302. An orthogonal conversion unit 304 performs orthogonal conversion of the L* signal, for example by Hadamard conversion or scattered COS conversion. Said orthogonal conversion is conducted for each block for extracting edge forms contained in the block, thereby improving the efficiency of quantization to be conducted afterwards.

In the following there is shown a second-order Hadamard Conversion, as an example of the orthogonal conversion:

$$Y = \frac{1}{\sqrt{m \times n}} \cdot HXH^T$$

wherein:
X: original m×n matrix
H: Hadamard matrix
$H^T$: inverted matrix of H
Y: m×n matrix after conversion.

Adopting the structure of L* shown in FIG. 2C for X:

$$X = \begin{pmatrix} X_{11} & X_{12} & X_{13} & X_{14} \\ X_{21} & X_{22} & X_{23} & X_{24} \\ X_{31} & X_{32} & X_{33} & X_{34} \\ X_{41} & X_{42} & X_{43} & X_{44} \end{pmatrix}$$

the above-explained equation can be written as follows in the present embodiment wherein m=n=4:

$$Y_{16} = \tfrac{1}{4} \times H_{16} X_{16}$$

wherein
$X_{16} = [X_{11}, X_{12}, \ldots, X_{22}, \ldots, X_{44}]^T$
$Y_{16} = [Y_{11}, Y_{12}, \ldots, Y_{22}, \ldots, Y_{44}]^T$
$H_{16}$: 16×16 Hadamard matrix
so that $$\begin{vmatrix} Y_{11} \\ Y_{12} \\ Y_{13} \\ Y_{14} \\ Y_{21} \\ Y_{22} \\ Y_{23} \\ Y_{24} \\ Y_{31} \\ Y_{32} \\ Y_{33} \\ Y_{34} \\ Y_{41} \\ Y_{42} \\ Y_{43} \\ Y_{44} \end{vmatrix} = 1/4 \begin{vmatrix} + + + + + + + + + + + + + + + + \\ + + - - + + - - + + - - + + - - \\ + - + - + - + - + - + - + - + - \\ + - - + + - - + + - - + + - - + \\ + + + + + + + + - - - - - - - - \\ + + - - + + - - - - + + - - + + \\ + - + - + - + - - + - + - + - + \\ + - - + + - - + - + + - - + + - \\ + + + + - - - - + + + + - - - - \\ + + - - - - + + + + - - - - + + \\ + - + - - + - + + - + - - + - + \\ + - - + - + + - + - - + - + + - \\ + + + + - - - - - - - - + + + + \\ + + - - - - + + - - + + + + - - \\ + - + - - + - + - + - + + - + - \\ + - - + - + + - - + + - + - - + \end{vmatrix} \times \begin{vmatrix} X_{11} \\ X_{12} \\ X_{13} \\ X_{14} \\ X_{21} \\ X_{22} \\ X_{23} \\ X_{24} \\ X_{31} \\ X_{32} \\ X_{33} \\ X_{34} \\ X_{41} \\ X_{42} \\ X_{43} \\ X_{44} \end{vmatrix}$$

Figure 4A:
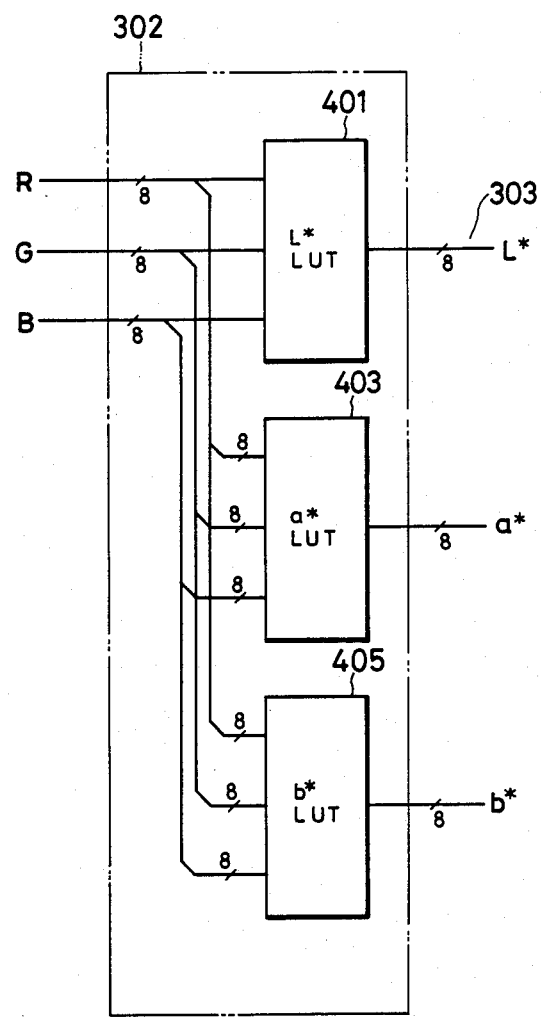
FIG. 4A is a block diagram of an L*a*b* converting unit.
Figure 4B:
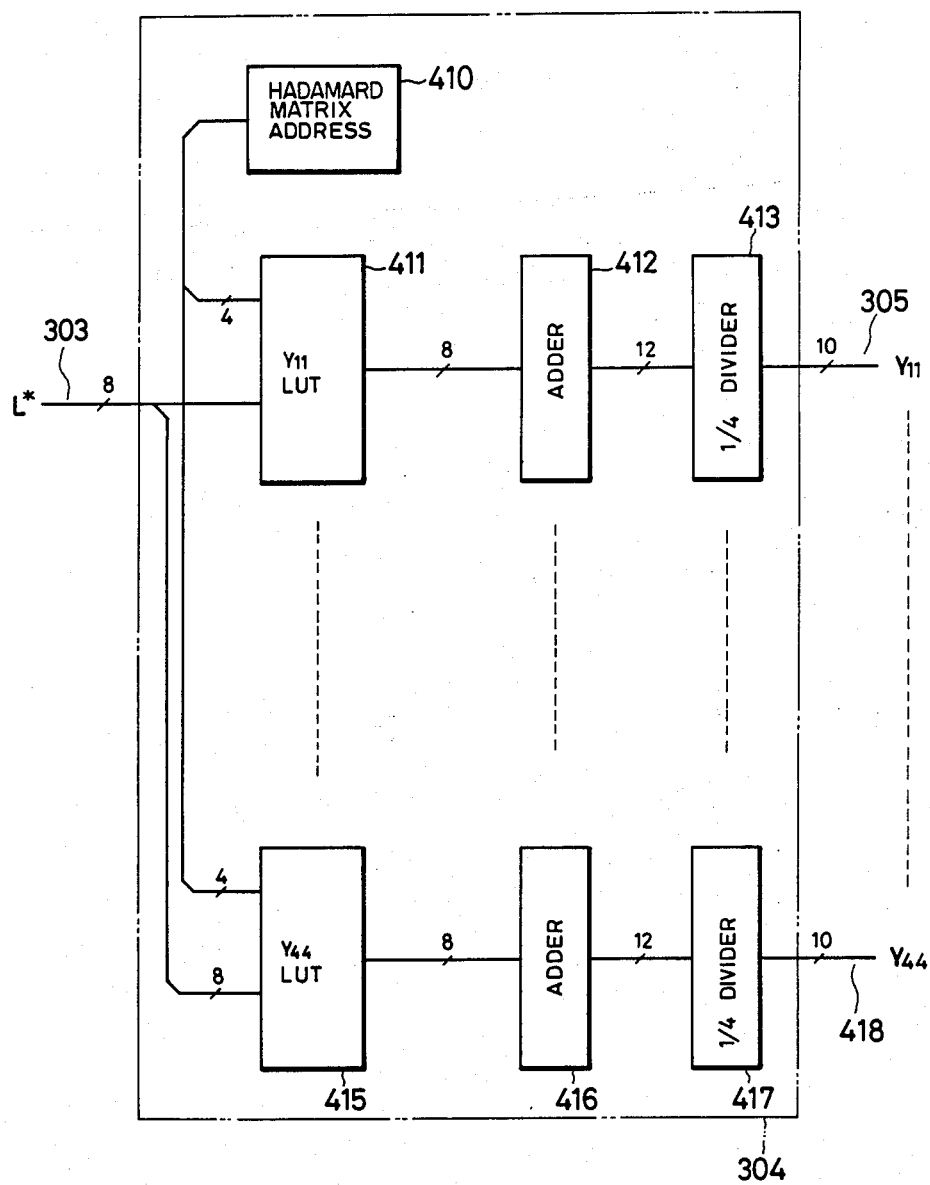
FIG. 4B is a block diagram of an orthogonal converting unit.

FIG. 4A shows an example of said L*a*b* converting unit 302, wherein the conversion is achieved by a look up table process utilizing table memories 401, 402, 403, storing conversion table corresponding to the above-mentioned equations, accessible by the R, G, B signals. In this manner the R, G, B signals are converted, in each pixel, into the L*, a*, b* signals or reduced mutual correlation. An L* signal 303 is released, in the order of $X_{11}, X_{12}, \ldots, X_{21}, \ldots, X_{44}$ in the L* block shown in FIG. 2C, from the L*a*b* conversion FIG. 4B shows an example of the circuit employing an orthogonal conversion unit 304 for Hadamard conversion, wherein provided are an Hadamard matrix address generator 410 for generating addresses in the row direction in the matrix calculation; circuits 411, 412, 413 for calculating $Y_{11}$ from $X_{ij}$ in the foregoing equation, wherein 411 is a look-up table for multiplying the input values $X_{ij}$ with coefficients of the Hadamard matrix, 412 is an adder for cumulatively adding values sequentially output of the look-up table 411, and 413 is a ¼ divider for multiplying the output of the adder 412 with ¼; and circuits 415-417 for similarly obtaining $Y_{44}$ from $X_{ij}$. There are in fact provided 16 sets of circuits for obtaining $Y_{11}$-$Y_{14}$, $Y_{21}$-$Y_{24}$, $Y_{31}$-$Y_{34}$ and $Y_{41}$-$Y_{44}$ from $X_{ij}$ to respectively execute following 16 calculations:

$$Y_{11} = 1/4(X_{11} + X_{12} + X_{13} + \ldots + X_{44})$$

$$Y_{44} = 1/4(X_{11} - X_{12} - X_{13} + \ldots X_{44})$$

In FIG. 3, a signal 305 corresponds to an output $Y_{11}$ of the orthogonal conversion unit 304, representing a DC component close to the average value of $Y_{ij}$ of the block, and being a coefficient indicating the luminosity or light level of the block. A quantizer 307 quantizes said value $Y_{11}$ of 10 bits into 8 bits to obtain light information L 308.

Other fifteen coefficients $Y_{12}$-$Y_{44}$ (306) represent the edge structure present in the block and are encoded by a digitizer 309 into 12-bit structure information S 310 corresponding to one of 4096 patterns determined in advance. Thus the structure information 310 represents the form of the edge contained in each block.

Averaging circuits 311, 312, composed of adders and dividers, respectively calculate average values $\overline{a^*}$, $\overline{b^*}$ of the signals $a^*$, $b^*$ for each block, supplied by the L*a*b* conversion unit 302.

A quantizer 313 collectively quantizes the block average values of $a^*$ and $b^*$ into a 12-bit signal, thus providing the color information C 314 of each block.

The digitizer 307, 309, 313 can be effectively composed of vector digitizers.

A multiplexer 315 collects the luminosity (L) information 308, structure (S) information 310 and color (C) information 314, obtained in the above-explained manner, into a code 316, as shown in FIG. 1, for each block.

In this manner the R, G, B signals supplied for example from a color scanner are converted, for each block of a predetermined size, into the L*, a*, b* signals of low mutual correlation, and the color image of each block is represented by the luminosity information, structure information and color information, based on said signals.

In reproducing the color image by decoding the above-explained code, each area defined by the edge, defined by the structure information, in each block is painted with a color represented by the luminosity information and the color information. In this manner the color original image can be satisfactorily reproduced.

In the present embodiment the R, G, B signals are converted into the L*, a*, b* signals, but there may also be employed a L*a*v* signal system, a YIQ signal system for NTSC format, a PAL signal system or a YUV signal system.

Also for the orthogonal conversion there may be employed a scattered COS conversion or a slant conversion instead of the Hadamard conversion.

Furthermore, the quantizers are not limited to the aforementioned vector quantizers, and the bit allocations of the L, S and C information are not limited to the foregoing explanation.

Furthermore the input signals are not limited to red, green and blue but may be composed of yellow (Y), magenta (M) and cyan (C), for example, according to the image sensor employed.

Also the values $a^*$, $b^*$ may be preserved in more precise manner, instead of the average value thereof.

As explained in the foregoing, this encoding process allows efficient encoding, as the original color image data are converted into signals of lower mutual correlation, then said converted signals are separated into three elements respectively representing the luminosity, structure and color, and said three components are independently encoded as shown in FIG. 1.

Figure 5:
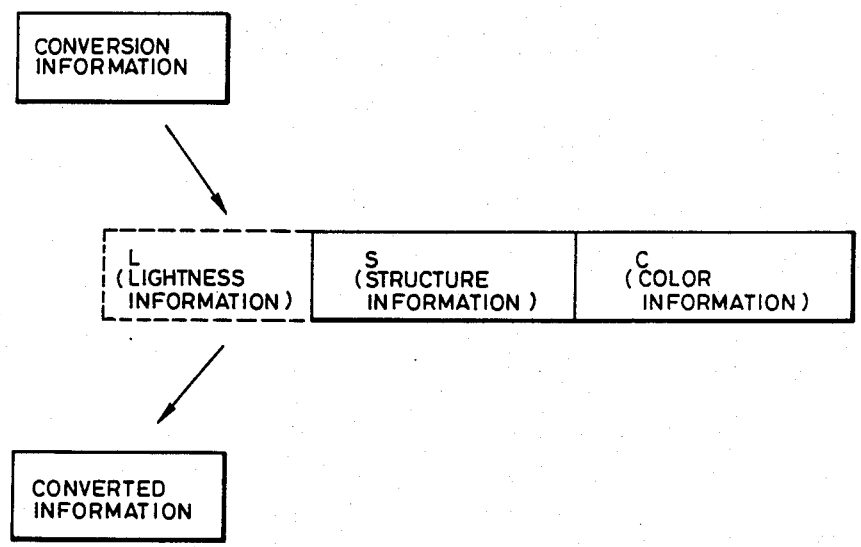
FIGS. 5 and 6 are views of portions of data processing in luminosity conversion and color conversion.
Figure 6:
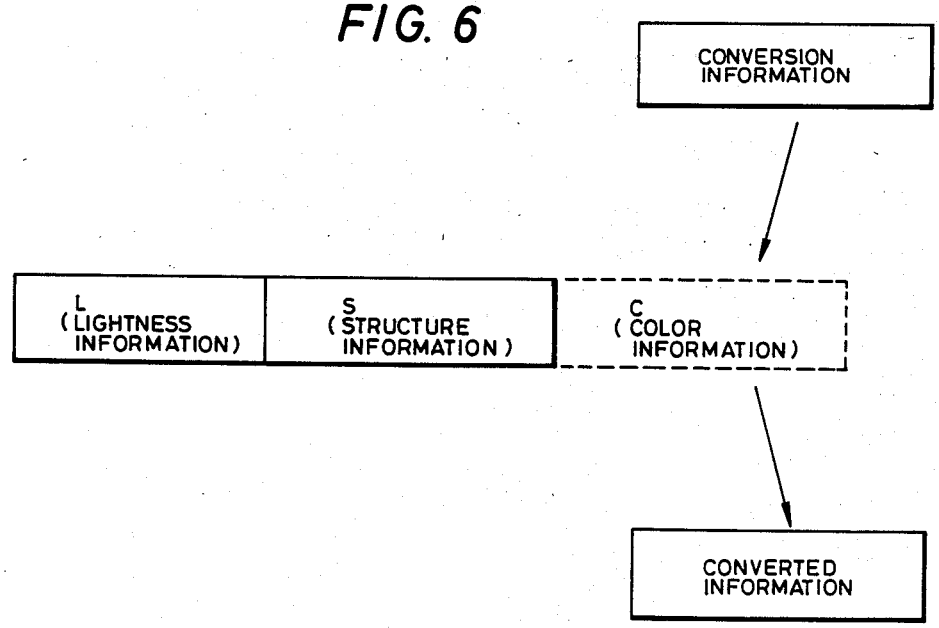

If a conversion is required on the color image data encoded as shown in FIG. 1, there may be conducted a conversion on the light information only as shown in FIG. 5 if the conversion on the luminosity only is required, or a conversion on the color information only as shown in FIG. 6 if the conversion on the color only is required.

In the following there will be explained the conversion in luminosity and in color, in the above-explained encoding process.

Figure 7:
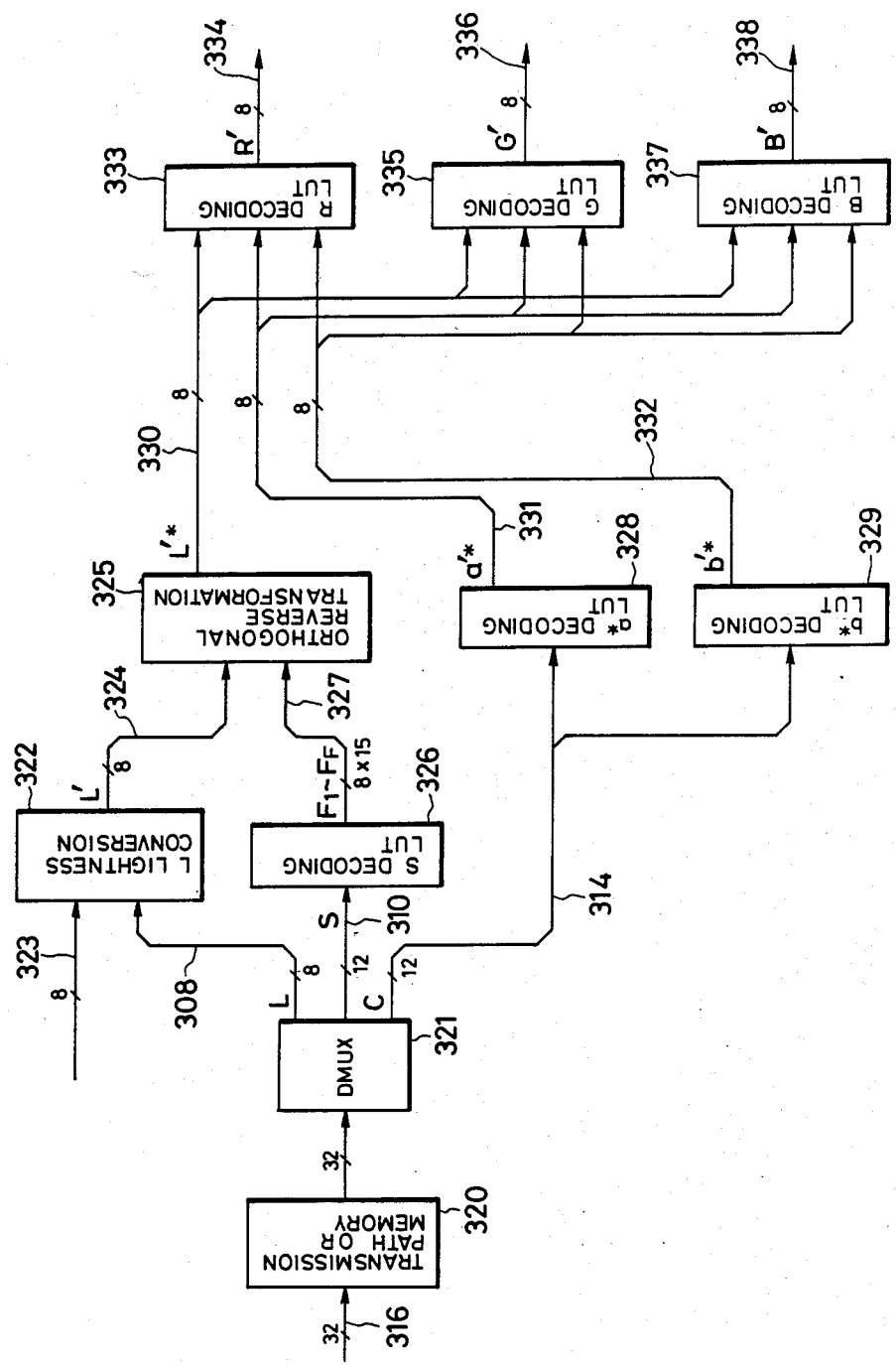
FIGS. 7 and 8 are block diagrams of circuits for luminosity conversion and decoding.

FIG. 7 shows a circuit for achieving a conversion in luminosity.

Figure 8:
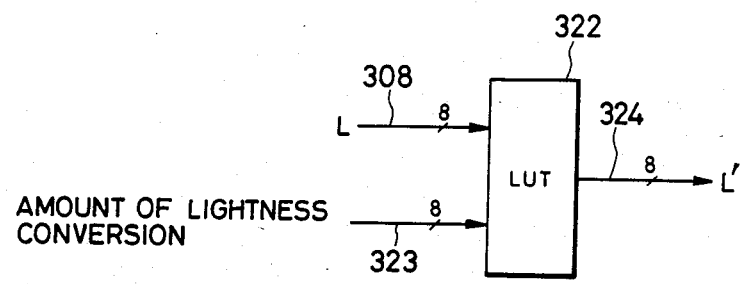
Figure 9:
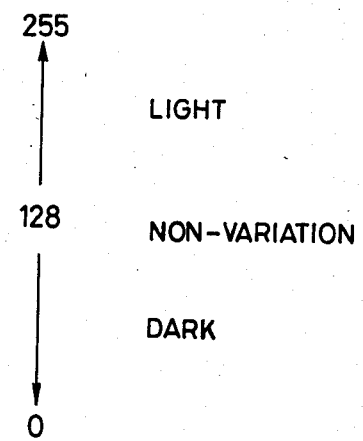
FIG. 9 is a chart showing an example of luminosity conversion.

In FIG. 7 there are shown a transmission channel or a memory 320; a demultiplexer 321 for performing a function inverse to that of the multiplexer 315 shown in FIG. 3, for parallel conversion of the luminosity, structure and color information of the serial encoded data shown in FIG. 1; a conversion unit 322 for light or luminosity conversion; a 8-bit input signal 323 to said conversion unit 322 for controlling the level of said conversion. FIG. 8 shows an example of the circuit when said conversion unit 322 is composed of a look-up table (LUT). The signal L is converted, by said luminosity conversion, into a signal L'. FIG. 9 shows an example of conversion of the 8-bit luminosity signal, in a range from 0 to 255. Thus there can be made variations of 256 levels, in which a value 128 is a default value corresponding to no variation. The control signal 323 may be manually varied by the operator through keys or levers provided on an operation unit, or automatically varied for example according to an output equipment.

In FIG. 7 there are further shown an inverse orthogonal converter 325, which can be composed of a hardware same as that of the orthogonal converter 304 shown in FIG. 3 and employed in encoding; a decoding unit 326 provided with a look-up table for decoding the structure information S; an output signal 327 thereof; decoding units 328, 329 provided with look-up tables for respectively decoding the color information a*, b*; decoding L*, a* and b* signals 330, 331, 332; decoding units 333, 335, 337 respectively for decoding the R', G' and B' signals; and output lines 334, 336, 338 for the decoded R', G' and B' signals. In this manner the conversion of the luminosity can be achieved in a simple manner.

FIG. 10 indicates the data format of the color information C, which is represented by hue $\theta$ and saturation h in an a*-b* space. FIG. 11A shows the relationship between the hue $\theta$ and the saturation h. FIG. 11B shows the mode of division on the a*-b* space, wherein a lattice point, as indicated by 501, is selected as a representative color by the quantizing circuit 313 shown in FIG. 3.

Figure 12:
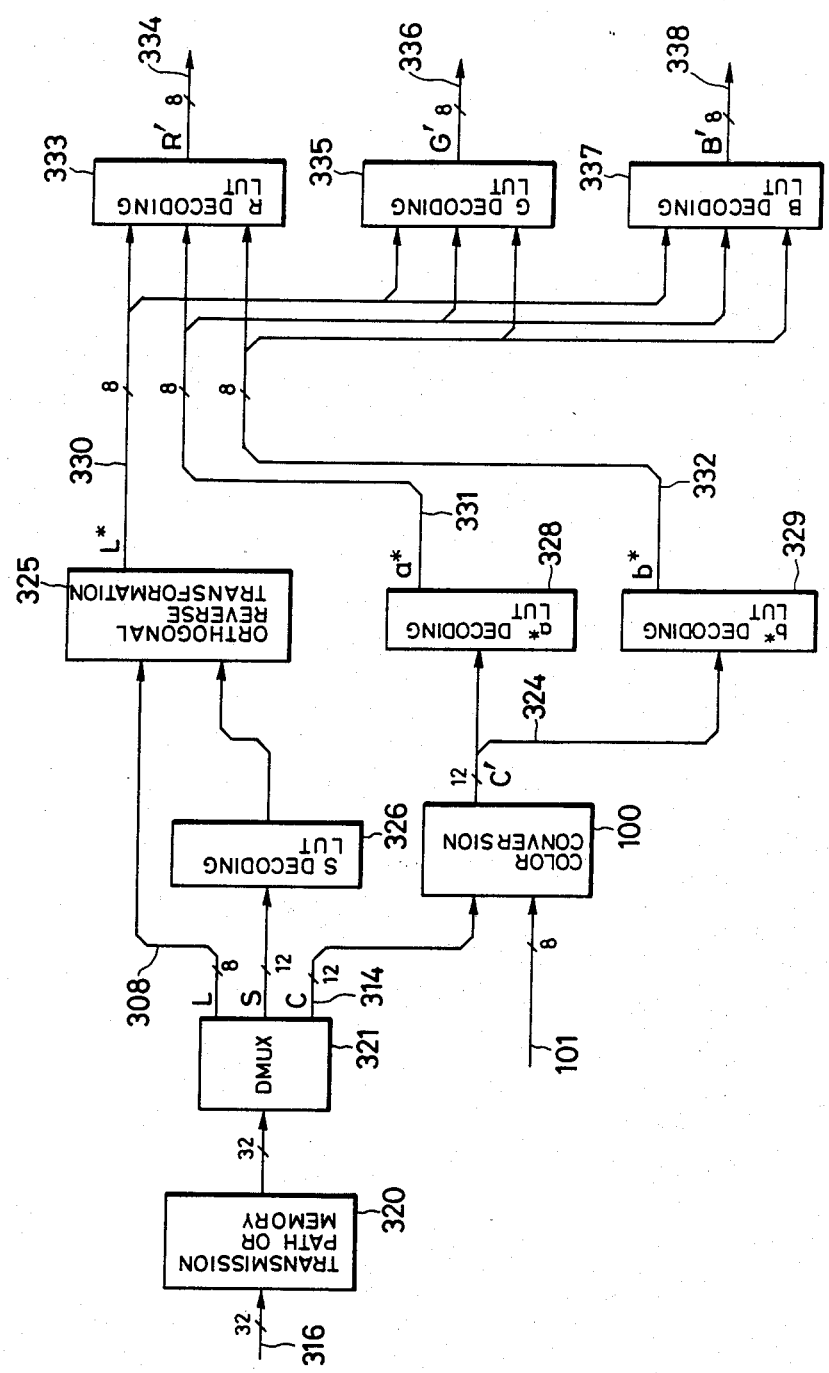

FIG. 12 shows an embodiment of a conversion-decoding circuit for effecting a color conversion combined with decoding. Said circuit is different from the luminosity converting circuit shown in FIG. 7, in that the luminosity conversion unit 322 is replaced by a color data conversion unit 100. A signal instructing the mode of color data conversion is supplied to said color data conversion unit 100 through a color conversion control line 101. Said color conversion provides converted color information C'. FIG. 13 shows an example of the circuit in which the color data conversion unit 100 is composed of a look-up table.

The color conversion is conducted as shown in FIGS. 14A and 14B. In the 8-bit control signal, the upper 4 bits define the amount of variation in the hue, while the lower 4 bits define the amount of variation in the saturation h. Said signal 101 may be varied by the operator or according to the output equipment.

As explained in the foregoing, the color image data separated into three elements respectively representing luminosity, structure and color can be easily subjected to a conversion process of color information or luminosity information in encoded state.

Arbitrary conversion on luminosity and color information is rendered possible by employing both the luminosity conversion unit 322 shown in FIG. 7 and the color conversion unit 100 shown in FIG. 12.

Though the present invention has been explained by preferred embodiments thereof, it is not limited to such embodiments but is subject to various modifications and variations within the scope and spirit of the appended claims.

We claim:

1. A color image data encoding apparatus comprising:
   dividing means for dividing color image data into blocks;
   extraction means for extracting luminosity information relating to the light level of each block, structure information relating to the structure of each block, and color information relating to the color of each block; and
   encoding means for encoding said color image data, said encoding means individually encoding the luminosity information, the structure information and the color information thus extracted.

2. A color image data encoding apparatus according to claim 1, wherein said color image data are represented by a signal system employing signals of low mutual correlation.

3. A color image data encoding apparatus according to claim 2, wherein said color image data are represented by an L*a*b* signal system.

4. A color image data encoding apparatus according to claim 3, wherein said extraction means comprises orthogonal transformation means and is adapted to effect an orthogonal transformation on the L* component of the color image data of each block and to extract said luminosity information and said structure information from each block.

5. A color image data encoding apparatus according to claim 4, wherein said orthogonal transformation means carries out a Hadamard transformation.

6. A color image data encoding apparatus according to claim 3, further comprising conversion means for converting color image data represented by an RGB signal system to the color image data represented by the L*a*b* signal system.

7. A color image data encoding apparatus according to claim 1, wherein said structure information is information related to an image edge.

8. A color image data encoding apparatus according to claim 1, wherein said encoding means individually vector-quantizes the luminosity information, the structure information and the color information.

9. A color image data encoding apparatus comprising:
   dividing means for dividing color image data into blocks;
   extraction means for extracting luminosity information relating to the light level of each block, structure information relating to the structure of each block, and color information relating to the color of each block;
   quantizing means for individually quantizing the luminosity information, the structure information and the color information thus extracted; and
   process means for processing the luminosity or color information thus quantized.

10. A color image data encoding apparatus according to claim 9, wherein said process means is adapted to vary a value of said luminosity information.

11. A color image data encoding apparatus according to claim 9 wherein said color information comprises hue and saturation information for each block, and said process means is adapted to vary a value of hue or saturation represented by said color information.

12. A color image data encoding apparatus according to claim 9, wherein said color image data are represented by a signal system employing signals of low mutual correlation.

13. A color image data encoding apparatus according to claim 12, wherein said color image data are represented by an L*a*b* signal system.

14. A color image data encoding apparatus according to claim 13, further comprising conversion means for converting color image data represented by an RGB signal system to the color image data represented by the L*a*b* signal system.

15. A color image data encoding apparatus according to claim 13, wherein said extraction means comprises orthogonal transformation means and is adapted to effect an orthogonal transformation on the L* component of the color image data of each block and to extract said luminosity information and said structure information from each block.

16. A color image data encoding apparatus according to claim 15, wherein said orthogonal transformation means carries out a Hadamard transformation.

17. A color image data encoding apparatus according to claim 9, wherein said quantizing means individually vector-quantizes the luminosity information, the structure information and the color information.

* * * * *

UNITED STATES PATENT AND TRADEMARK OFFICE
CERTIFICATE OF CORRECTION

PATENT NO. : 4,887,151
DATED : December 12, 1989
INVENTOR(S) : MASAFUMI WATAYA

Page 1 of 4

It is certified that error appears in the above-identified patent and that said Letters Patent is hereby corrected as shown below:

ON TITLE PAGE:

IN [30] FOREIGN APPLICATION PRIORITY DATA

"Jan. 28, 1987 [JP]  Japan ............... 62-159434
 Jan. 28, 1987 [JP]  Japan ............... 62-159444"

should read

--Jan. 28, 1987 [JP]  Japan .............. 62-15943
  Jan. 28, 1987 [JP]  Japan .............. 62-15944--.

IN [57] ABSTRACT

Line 6, "image" should read --image,--.

AFTER SHEET 9 OF 9

Insert Sheet 10 of 10, FIG. 13

FIG. 13

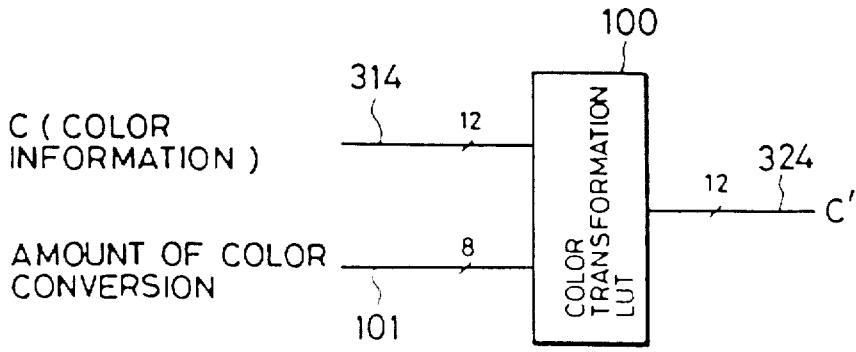

UNITED STATES PATENT AND TRADEMARK OFFICE
CERTIFICATE OF CORRECTION

PATENT NO. : 4,887,151
DATED : December 12, 1989
INVENTOR(S) : MASAFUMI WATAYA

It is certified that error appears in the above-identified patent and that said Letters Patent is hereby corrected as shown below:

AFTER SHEET 9 OF 9

Insert Sheet 10 of 10, FIG. 14A and FIG. 14B

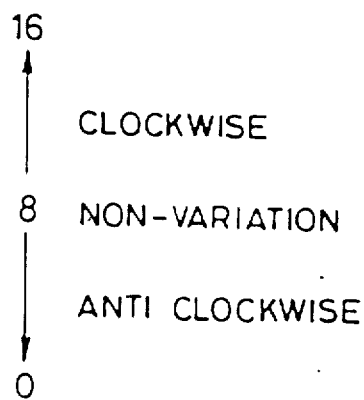

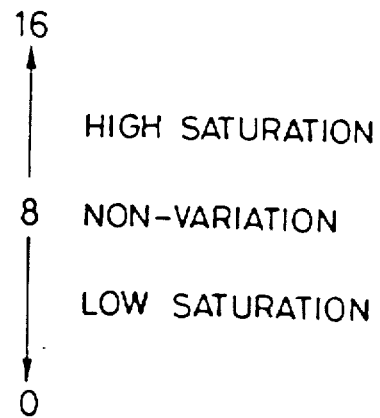

UNITED STATES PATENT AND TRADEMARK OFFICE
CERTIFICATE OF CORRECTION

PATENT NO. : 4,887,151
DATED : December 12, 1989
INVENTOR(S) : MASAFUMI WATAYA

Page 3 of 4

It is certified that error appears in the above-identified patent and that said Letters Patent is hereby corrected as shown below:

COLUMN 1

Line 26, "as" should read --an--.

COLUMN 3

Line 35, "pixels to define a block of 4X4 pixels." should read --pixels.--.
    Line 37, "$L^*a^*B^*$ system" should read --$L^*a^*b^*$ system--.
    Line 65, "or" should read --of--.
    Line 67, "$X_{11}, X_{12}, ..., X_{21}, ..., X_{44}$," should read --$X_{11}, X_{12}, ..., X_{21}, X_{22}, ..., X_{44}$,--.

COLUMN 4

Line 9, "Conversion" should read --conversion--.
    Line 63, "provided are an" should read --are provided an--.

COLUMN 5

Line 6, "$Y_{31-Y34}$ and $Y_{41-Y44}$" should read --$Y_{31}-Y_{34}$ and $Y_{41}-Y_{44}$--.
    Line 7, "$X_{ij}$ to" should read --$X_{ij}$ to--.
    Line 24, "Other" should read --The other--.
    Line 35, "values of $a^*$ and $b^*$" should read --values of $\vec{a^*}$ and $\vec{b^*}$--.

UNITED STATES PATENT AND TRADEMARK OFFICE
CERTIFICATE OF CORRECTION

PATENT NO. : 4,887,151
DATED : December 12, 1989
INVENTOR(S) : MASAFUMI WATAYA

It is certified that error appears in the above-identified patent and that said Letters Patent is hereby corrected as shown below:

COLUMN 6

Line 6, "value" should read --values--.
    Line 32, "conversion; a" should read --conversion; and an--.
    Line 55, "decoding $L^*$, $a^*$ and $b^*$ signals 330, 331, 332;" should read --decoded $L^*$, $a^*$ and $b^*$ signals 330, 331, 332;--.
    Line 67, "quantizing, circuit 313" should read --quantizing circuit 313--.

COLUMN 7

Line 35, "We claim:" should read --I claim:--.

COLUMN 8

Line 34, "claim 9" should read --claim 9,--.

Signed and Sealed this

Fourteenth Day of January, 1992

Attest:

HARRY F. MANBECK, JR.

*Attesting Officer*       *Commissioner of Patents and Trademarks*